United States Patent [19]

Suedholt et al.

[11] Patent Number: 5,537,981
[45] Date of Patent: Jul. 23, 1996

[54] AIRFLOW ERROR CORRECTION METHOD AND APPARATUS

[75] Inventors: Michael Suedholt, Wolkering; Manfred Wier, Wenzenbach, both of Germany

[73] Assignee: Siemens Aktiengesellschaft, Munich, Germany

[21] Appl. No.: 398,854

[22] Filed: Mar. 6, 1995

Related U.S. Application Data

[63] Continuation-in-part of Ser. No. 68,243, May 27, 1993, abandoned.

[30] Foreign Application Priority Data

May 27, 1992 [EP] European Pat. Off. ............. 92108966

[51] Int. Cl.$^6$ ................................................ F02M 51/00
[52] U.S. Cl. .......................................... 123/478; 123/480
[58] Field of Search .................................. 123/478, 480, 123/492, 488, 494, 679

[56] References Cited

U.S. PATENT DOCUMENTS

| | | | |
|---|---|---|---|
| 4,773,375 | 9/1988 | Okino et al. | 123/488 |
| 4,919,100 | 4/1990 | Nakamura | 123/492 |
| 4,957,088 | 9/1990 | Hosaka | 123/480 |
| 4,986,243 | 1/1991 | Weissler, II et al. | 123/488 |
| 5,050,560 | 9/1991 | Plapp | 123/488 |
| 5,117,795 | 6/1992 | Ohsuga et al. | 123/478 |
| 5,134,984 | 8/1992 | Nonaka et al. | 123/494 |
| 5,159,914 | 11/1992 | Follmer et al. | 123/494 |
| 5,165,381 | 11/1992 | Miyashita et al. | 123/679 |
| 5,211,150 | 5/1993 | Anzai | 123/480 |
| 5,226,393 | 7/1993 | Nagano et al. | 123/478 |
| 5,231,958 | 8/1993 | Takahashi et al. | 123/478 |

FOREIGN PATENT DOCUMENTS

| 3344276 | 6/1984 | Germany | 123/478 |
|---|---|---|---|

OTHER PUBLICATIONS

Patent Abstract of Japan No. JP 56–07124 (Matsuo et al) Nov. 13, 1981.
Patent Abstract of Japan No. JP 57–010415 (Kazumisu et al.), May 6, 1982.

Primary Examiner—Raymond A. Nelli
Attorney, Agent, or Firm—Herbert L. Lerner; Laurence A. Greenberg

[57] ABSTRACT

The method and associated apparatus ascertain an air value which is used in the mixture preparation in the event of pulsations of air in the intake tube of an internal combustion engine. During each intake stroke of a cylinder of the engine, a maximum value and a minimum value of an air flow are ascertained from measured values furnished by an air flow rate meter. A differential value is formed from a magnitude of the two extreme values. And the differential value is compared with a predeterminable threshold value. For air/fuel mixture is prepared on the basis of the air value. If certain conditions apply, the processor switches over from the measured values furnished by the air flow rate meter to predetermined substitute values from a substitute performance graph. The conditions which must be met for the switchover are that (a) the differential value is greater than the threshold value, (b) the throttle valve is opened by an angle greater than a predetermined angle, and (c) the engine is not in a non-steady operating state.

16 Claims, 3 Drawing Sheets

ND APPARATUS

AIRFLOW ERROR CORRECTION METHOD AND APPARATUS

CROSS-REFERENCE TO RELATED APPLICATION

This is a continuation-in-part of application Ser. No. 08/068,243, filed May 27, 1993 abandoned.

BACKGROUND OF THE INVENTION

FIELD OF THE INVENTION

The invention relates to a method and an apparatus for ascertaining an air value to be made the basis for mixture preparation, upon pulsations of air in an intake tube of an internal combustion engine, and to a system for mixing an air/fuel mixture in an internal combustion engine on the basis of the air value ascertained with the method.

In order to provide correct mixture preparation, fuel metering systems require accurate information regarding the mass of air aspirated by the engine per stroke. They receive such information through fast-response air flow rate meters, which operate according to the hot-film principle, for instance. Due to the high response speed, the output signal of the air flow rate meter follows every pulsation in the air flow. Even air masses that are flowing backward are detected, although with the wrong sign. As soon as such pulsations occur, the air flow rate meter therefore no longer furnishes any correct measurement values that could be usable for mixture preparation.

SUMMARY OF THE INVENTION

It is accordingly an object of the invention to provide a method and an apparatus for ascertaining the air value which is to be made the basis for mixture preparation, upon pulsations of the air in the intake tube of an internal combustion engine, which overcomes the hereinafore-mentioned disadvantages of the heretofore-known methods of this general type, with which the occurrence of such pulsations can be reliably detected and with which it becomes possible to supply the fuel metering system with correct air values even if pulsations occur. The term "air value" is intended to mean the value of the air flow rate, or the air mass per stroke derived from it.

With the foregoing and other objects in view there is provided, in accordance with the invention, a method for ascertaining an air value to be made a basis of mixture preparation in the event of pulsations of air in an intake tube of an internal combustion engine, which comprises during each intake stroke of a cylinder of the engine: measuring an air flow in an intake tube with an air flow rate meter, preparing an air/fuel mixture for the internal combustion engine based on measured air values furnished by the air flow rate meter, ascertaining a maximum value and a minimum value of an air flow from measured values furnished by an air flow rate meter, forming a differential value from a magnitude, amount or quantity of the two extreme values, predetermining a threshold value of an acceptable difference between the magnitudes of the two extremes, comparing the differential value with the predetermined threshold value, and substituting predetermined substitute air values from a substitute performance graph for the measured values in the preparing step, if: (a) the differential value is greater than the threshold value, and (b) the throttle valve is opened by an angle greater than a predetermined angle, and (c) the engine is not in a non-steady operating state.

In the method according to the invention, the occurrence of air pulsations is recognized from the output signal of the air flow rate meter, which is located in the intake tube of an internal combustion engine. To that end, during all or part of the intake stroke of an engine cylinder, the minimum and maximum extreme values of the measured values furnished by the air flow rate meter are ascertained. From these two extreme values, a differential value is formed. In other words, the amplitude of the pulsation is ascertained. If this value exceeds a predeterminable threshold value, then the pulsation is so pronounced that the measured values can no longer be used directly for controlling mixture preparation. Instead of these measured values, the mixture preparation means receives substitute values from a substitute performance graph as a function of the load, and in particular as a function of the current or present opening angle of the throttle valve, and as a function of the current or present engine rpm and intake tube pressure.

In order to enable mistakes to be precluded, the invention also specifies various peripheral conditions that must be met in order for a switchover from the measured values to the substitute values to occur:
a) Non-steady-state Operation The pulsation recognition must be carried out only if the engine is virtually in the range of the maximum cylinder charge. In the non-steady operating state, the changes in the throttle valve opening angle during acceleration or deceleration causes changes in the measured air values that do not originate in pulsations. Such measured values should be used entirely normally in mixture preparation and not be "masked out" as incorrectly interpreted pulsations.

In accordance with another mode of the invention, in order to recognize the non-steady operating state, in the present exemplary embodiment the magnitude of the difference between successive measured values is formed. If this magnitude exceeds a predetermined value, then a non-steady operating state is recognized, and a switchover to the substitute performance graph does not take place. In order to recognize the non-steady operating state, other variables can also be used, such as the opening angle of the throttle valve.
b) Throttle Valve Angle When the throttle valve angle is small, in order words in the partial-load or even idling range, pulsations can again occur, depending on the engine type being used. They are due to the crankcase ventilation, among other factors. However, their course is such that the air value averaged from the measured values can be used to control the mixture preparation.

Therefore no switchover to the substitute values should be done in this range.

In accordance with a further mode of the invention, the threshold value for the switchover from the measured values to the substitute values is selected to be higher than the threshold value for switching back from the substitute values to the measured values.

This hysteresis prevents constant switching back and forth in the presence of only slight fluctuations about the threshold value.

In accordance with an added mode of the invention, there is provided a method which comprises selecting the threshold value as a fixedly predetermined value.

In accordance with a concomitant mode of the invention, there is provided a method which comprises making the threshold value dependent on the engine rpm or on the load or on the engine temperature, or on a combination of these variables.

With the above and other objects in view there is also provided, in accordance with the invention, an apparatus for performing the method as described. The apparatus is claimed in combination with an internal combustion engine having a plurality of cylinders each defining an intake stroke during which an air/fuel mixture is aspirated into the respective cylinder, a throttle valve, a fuel injector for injecting fuel and preparing the air/fuel mixture, and an air intake tube through which air is supplied for the air/fuel mixture, an apparatus for ascertaining an air value to be made a basis of the air/fuel mixture preparation in the event of pulsations of air in the intake tube of the internal combustion engine. The apparatus comprises an air flow rate meter associated with the air intake tube for measuring air flow in the air intake tube, during each intake stroke of a cylinder of the engine; a processor unit receiving signals from the air flow rate meter representing measured air values, the processor unit having memory means for storing predetermined substitute air values in a substitute performance graph, and the processor unit being programmed to: ascertain a maximum value and a minimum value of the air flow from the measured air values furnished by the air flow rate meter; to form a differential value from a magnitude of the maximum and minimum values; to predetermine a threshold value of an acceptable difference between the magnitudes of the maximum and minimum values; to compare the differential value with the predetermined threshold value; to substitute the predetermined substitute air values from the substitute performance graph for the measured air values in the air/fuel mixture preparation, if: the differential value is greater than the threshold value, and the throttle valve is opened by an angle greater than a predetermined angle, and the internal combustion engine is not in a non-steady operating state.

Other features which are considered as characteristic for the invention are set forth in the appended claims.

Although the invention is illustrated and described herein as embodied in a method for ascertaining the air value, which is to be made the basis for mixture preparation, upon pulsations of the air in the intake tube of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
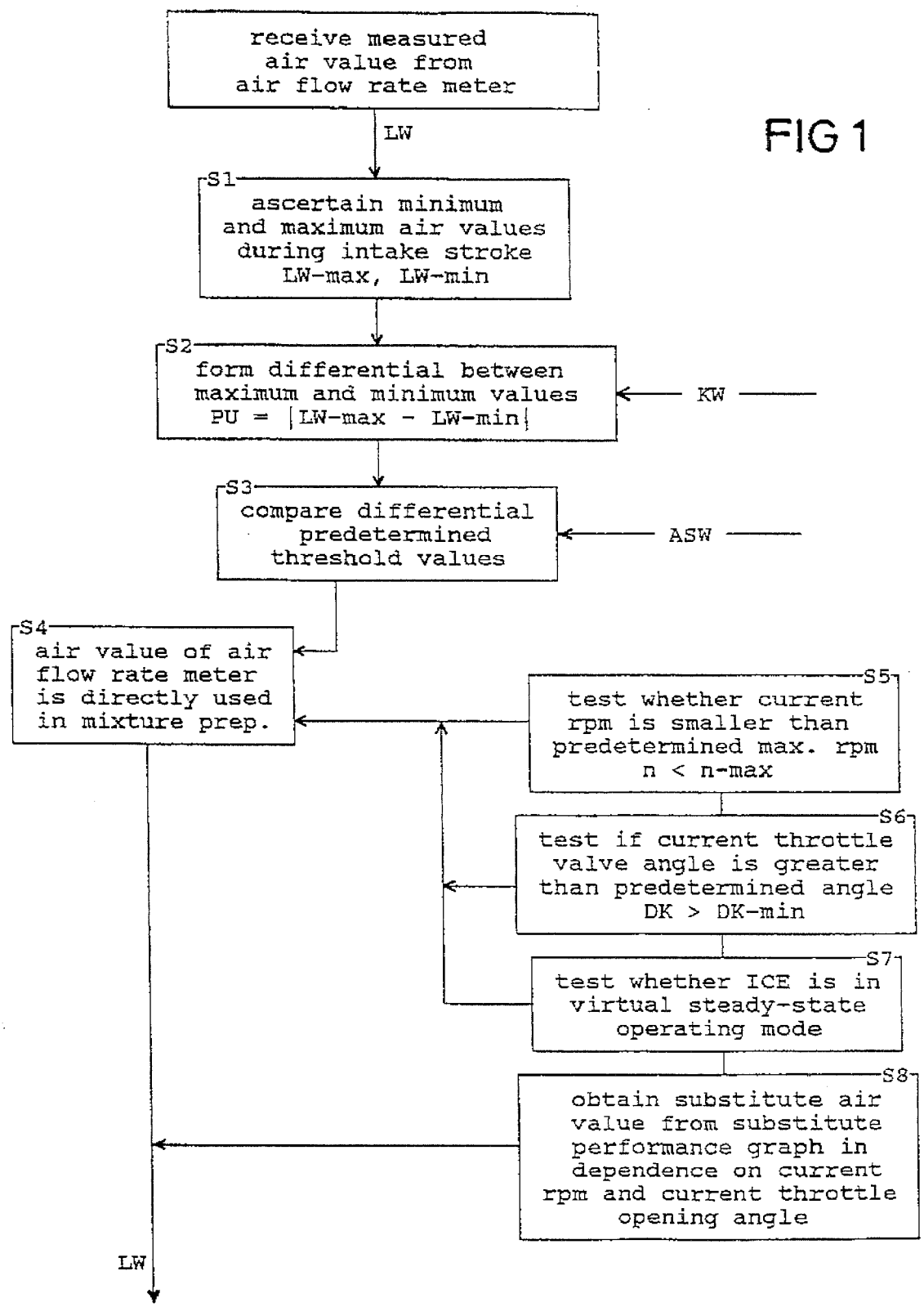
FIG. 1 is a flow chart illustrating the method according to the invention.

Referring now to the figures of the drawing in detail and first, particularly, to FIG. 1 thereof, it is seen that an air flow rate meter furnishes a variable that corresponds to the flow speed of the air. Taking the density of the air and the flow cross section into account, the mass of air LM that has flowed past the air flow rate meter during a certain unit of time (such as during one cylinder stroke) can be determined. These values will be referred to below as air values LW. In a method step S1, a minimum value LW_min and a maximum extreme value LW_max during one intake stroke of a cylinder of the engine are ascertained from these measured values LW. A crankshaft angle KW is used to fix the time of the intake stroke.

In a method step S2, a differential value is formed from these values, in the form of a magnitude of the difference between the two extreme values: PU=|LW_max−LW_min|.

In a method step S3, this differential value PU is compared with a predeterminable threshold value ASW. This threshold value may be a fixed value or may be specified as individual values as a function of rpm, load or engine temperature, for instance.

If the differential value is less than or equal to the threshold value in this comparison, then the measured value is used directly for controlling the mixture preparation in a method step S4. However, if the differential value is greater than the threshold value, then in a method step S5 a check is further made as to whether the current or present rpm n of the engine is below a predetermined rpm n_max. It has been found by measurement that at high rpm, pulsation virtually no longer occurs. In this range, unnecessarily great expense would have to be undergone for rapid measurement value detection and evaluation. Therefore, in the exemplary embodiment, no pulsation recognition is carried out in this high rpm range. In a method step S6, a check is made as to whether the throttle valve currently has a value DK that is greater than a predeterminable minimum value DK_min, and in a method step S7, a check is made as to whether or not the engine is in a virtually steady operating state (maximum cylinder charge). If the answers to all of these questions are no, then as above the measured value is likewise used for controlling the mixture preparation in the method step S4. However, if the answers are all yes, then in a method step S8 a substitute value corresponding to the current load, which in the exemplary embodiment is the substitute value corresponding to the rpm n and the current throttle valve opening angle DK, is taken from a substitute performance graph and used for controlling the mixture preparation.

Figure 2:
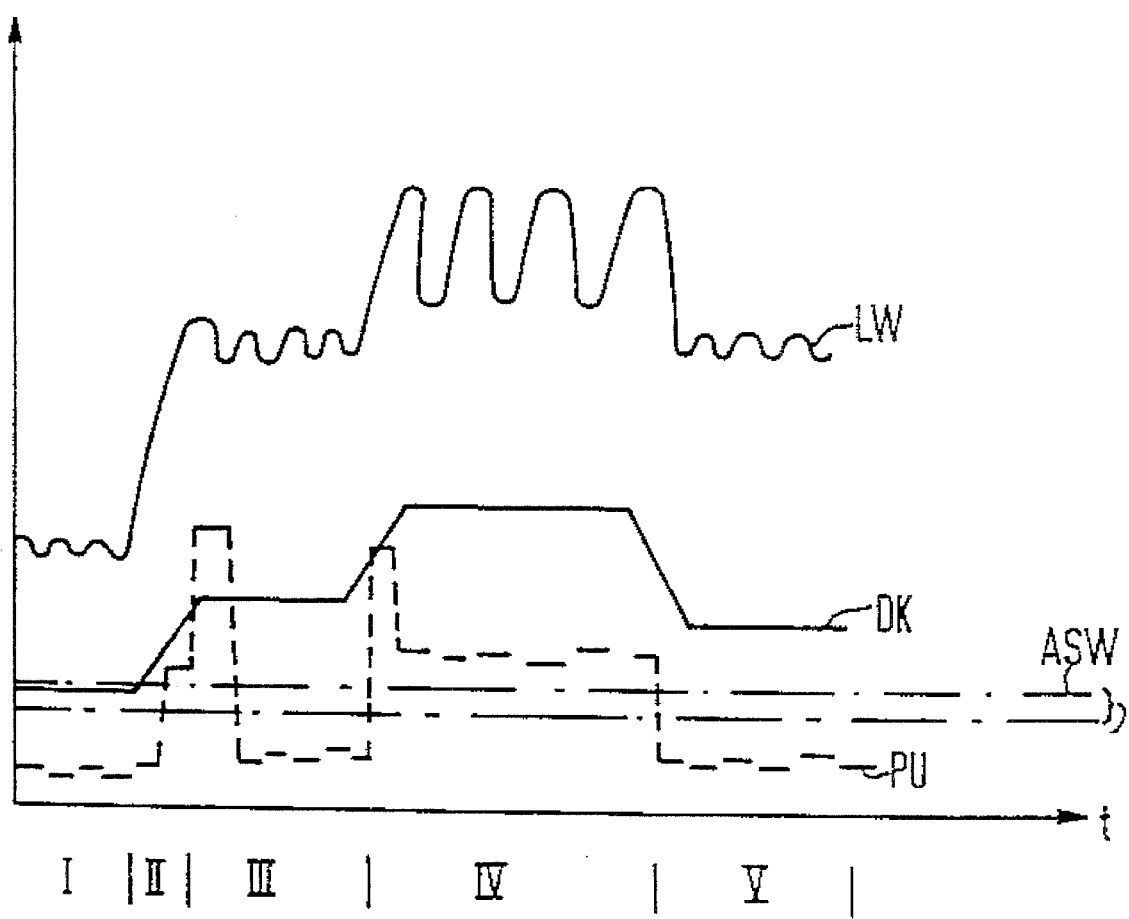
FIG. 2 is a graph showing an example of a course over time of air values with associated measured or calculated variables.

In FIG. 2, an upper, solid curve LW represents the air value furnished by the air flow rate meter, as plotted over time t. In a first range I, the air value LW has only a slight pulsation. The associated differential value PU, which is represented as a dashed curve at the bottom, has only low values.

If the throttle valve is then opened in a range II, noting that the opening angle DK of the throttle valve is represented as a middle curve, this produces a sharp rise in the air value LW and the air value curve exhibits a sharp rise, with an overswing at the top. As a consequence, the differential value PU rises sharply as well.

However, the pulsation recognition is not activated because this range is recognized as a non-steady-state operating range.

In a range III, the air value LW has slight pulsations at a higher level, but as in the range I, they are likewise so slight that the calculated differential value PU is below the switchover threshold ASW, which is represented as a horizontal dot-dash line.

In a range IV, the pulsation becomes greater. Consequently, the differential value PU also becomes greater, and in fact so great that it comes to be above the switchover threshold ASW. In this range IV, a switchover is then made to the substitute values from the substitute performance graph.

In a range V, the pulsation becomes slighter again and consequently, the differential value PU drops to below the switchover threshold ASW. A switch is made back from the substitute air values of the substitute performance graph to the measured values furnished by the air flow rate meter. Due to the hysteresis, the switchover this time takes place at the lower switchover threshold.

Figure 3:
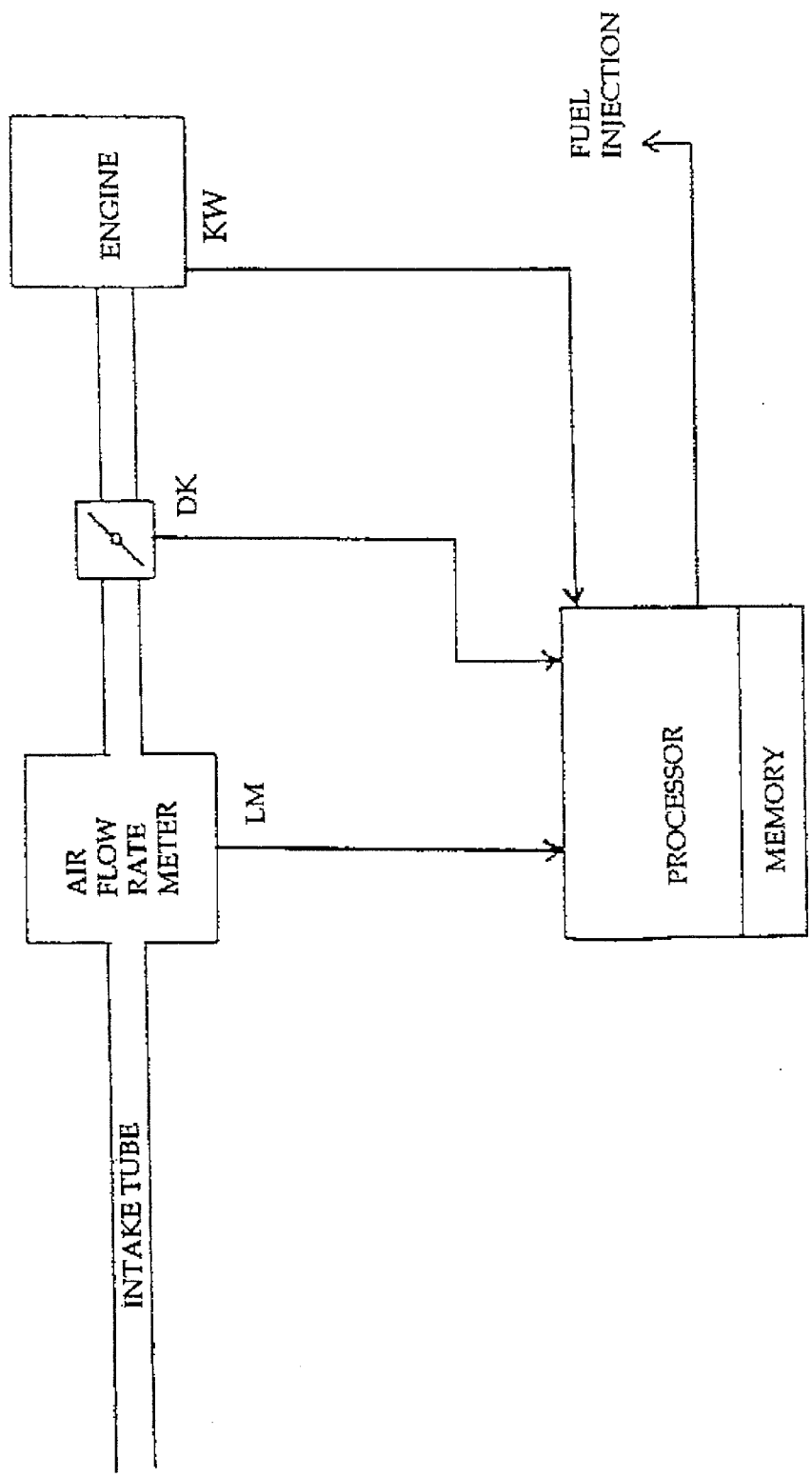
FIG. 3 is a diagrammatic view of a fuel injection and fuel metering system of the invention.

A system according to the invention is illustrated in FIG. 3. The system pertains to a fuel injected internal combustion engine, as detailed, for instance, in FIGS. 1 and 3 of U.S. Pat. No. 5,226,393 to Nagano et al., herein incorporated by reference.

FIG. 3 shows an air flow rate meter in an air intake tube leading to the internal combustion engine. The air flow rate meter is preferably a fast-response air flow rate meter operating according to the hot-film principle. Other devices of this kind may be chosen by a person of skill in the art without additional information herein. The air flow rate meter issues a signal LM, which represents the air mass aspirated through the intake tube. A throttle valve is connected with a valve position sensor which issues a signal DK, which is representative of the opening angle thereof. A position sensor at the engine crankshaft issues a crankshaft angle KW. All of the signals LM, DK and KW are supplied to a processor, which is programmed to process the above-described method. The processor controls the fuel injection as a result of the processing of the signals as described.

We claim:

1. A method for ascertaining, during each intake stroke of a cylinder in an intake tube of an internal combustion engine, with an intake throttle valve, a corrected airflow rate obtained from an airflow rate meter, to be used as the basis for an air-fuel ratio determination in the event of negative air pulsations causing airflow rate error signals, the method comprising the steps of:

measuring an intake airflow rate in said intake tube with an airflow rate meter and providing intake airflow rate signals representative thereof;

determining a control signal value for said air-fuel ratio determination for said internal combustion engine using said airflow rate signals;

ascertaining maximum and minimum values of said intake airflow rate signals;

calculating a differential value from a magnitude of said maximum and minimum values of said intake airflow rate signals;

calculating a predetermined threshold value of an acceptable differential between said maximum and minimum values of said intake airflow rate signals;

comparing said differential value with said predetermined threshold value;

and if said comparison shows:
      said differential value to be greater than said predetermined threshold value and,
      said throttle valve is opened to an angle greater than a predetermined angle and,
      said engine is in a non steady-state operating condition;
   substituting predetermined substitute values from a substitute performance graph for said measured values in said 'control signal value for air-fuel ratio determination' step, and;

applying said substitute value to any external injector control circuit to provide a resulting optimized air-fuel ratio mixture to said internal combustion engine.

2. The method according to claim 1, which comprises recognizing a non steady-state operating condition of the engine whenever a magnitude of a difference between two successive measured values exceeds a predetermined value.

3. The method according to claim 1, which comprises setting the threshold value for the switchover to the substitute values of the substitute performance graph to be greater than a threshold value for a switchover back from the substitute performance graph to the measured values of the air flow rate meter.

4. The method according to claim 1, which comprises selecting the threshold value as a fixedly predetermined value.

5. The method according to claim 1, which comprises making the threshold value dependent on the engine rpm.

6. The method according to claim 1, which comprises making the threshold value dependent on the load.

7. The method according to claim 1, which comprises making the threshold value dependent on the engine temperature.

8. The method according to claim 1, which comprises making the threshold value dependent on a combination of the engine rpm, the load and the engine temperature.

9. An apparatus operating in combination with an internal combustion engine having a plurality of cylinders each of which defines an intake stroke during which an air-fuel mixture is aspirated into each of respective said cylinders, a throttle valve, a fuel injector for injecting fuel resulting in a desired said air-fuel mixture, an air intake tube through which air is supplied for said air-fuel mixture; said apparatus operating to ascertain a desired air value to be calculated for the purpose of optimizing said air-fuel mixture in the event of negative air pulsations causing airflow rate error signals, said apparatus comprising:

an airflow rate meter located in said air intake tube for measuring airflow in said air intake tube and providing intake air signals representative thereof;

a microprocessor unit receiving input signals from said airflow rate meter representative of measured intake airflow rate values, said microprocessor unit being inclusive of a memory means for storing predetermined 'substitute air values' from a 'substitute performance graph', said microprocessor further being programmed to ascertain maximum and minimum values of said intake air signals;

calculate a differential value from a magnitude of said maximum and minimum values of said intake air flowrate values;

calculate a predetermined threshold value of an acceptable differential between said maximum and minimum values of said intake airflow rate values;

compare said differential value with said predetermined threshold value and;

if said comparison shows:
      said differential value to be greater than said predetermined threshold value and,
      said throttle valve is opened to an angle greater than a predetermined angle and,
      said engine is in a non steady-state operating condition;
   substitute said predetermined 'substitute air values' from said substitute performance graph for said measured intake air signals representative thereof; and apply said substitute values to any external injector control circuit to provide a resulting optimized air-fuel ratio mixture to said internal combustion engine.

10. The apparatus according to claim 9, wherein said processor unit is further programmed to recognize a non steady-state operating condition of the engine whenever a magnitude of a difference between two successive measured values exceeds a predetermined value.

11. The apparatus according to claim 9, wherein said processor unit is further programmed to set the threshold value for the switchover to the substitute values of the substitute performance graph to be greater than a threshold value for a switchover back from the substitute performance graph to the measured values of said air flow rate meter.

12. The apparatus according to claim 9, wherein said processor unit is further programmed to select the threshold value as a fixedly predetermined value.

13. The apparatus according to claim 9, wherein said processor unit is further programmed to make the threshold value dependent on the engine rpm.

14. The apparatus according to claim 9, wherein said processor unit is further programmed to make the threshold value dependent on the load.

15. The apparatus according to claim 9, wherein said processor unit is further programmed to make the threshold value dependent on the engine temperature.

16. The apparatus according to claim 9, wherein said processor unit is further programmed to make the threshold value dependent on a combination of the engine rpm, the load and the engine temperature.

* * * * *